United States Patent
Peng

(10) Patent No.: US 8,340,734 B2
(45) Date of Patent: Dec. 25, 2012

(54) SLIDING MECHANISM FOR SLIDE-TYPE ELECTRONIC DEVICE

(75) Inventor: Tse-Shan Peng, Tu-Cheng (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 373 days.

(21) Appl. No.: 12/749,636

(22) Filed: Mar. 30, 2010

(65) Prior Publication Data
US 2010/0321867 A1 Dec. 23, 2010

(30) Foreign Application Priority Data
Jun. 18, 2009 (CN) .......................... 2009 1 0303420

(51) Int. Cl.
*H04M 1/00* (2006.01)
(52) U.S. Cl. ................................ 455/575.4; 361/679.39
(58) Field of Classification Search ............... 455/575.4, 455/550.1, 575.1, 575.8, 90.3; 361/679.39, 361/679.55, 807, 814, 679.01; 267/69; 292/17; 384/26
See application file for complete search history.

(56) References Cited

U.S. PATENT DOCUMENTS
7,102,881 B2 * 9/2006 Park et al. ................ 361/679.08
7,773,374 B2 * 8/2010 Dong et al. ............... 361/679.39
7,853,300 B2 * 12/2010 Seidler ........................ 455/575.4

FOREIGN PATENT DOCUMENTS
CN 101562956 A 4/2008

* cited by examiner

*Primary Examiner* — Ping Hsieh
(74) *Attorney, Agent, or Firm* — Altis Law Group, Inc.

(57) ABSTRACT

A sliding mechanism for a portable electronic device includes a fixing member, at least one first elastic member arranged at a side of the fixing member, a sliding member, and at least one second elastic member arranged at a side of the sliding member. The first elastic member includes an arcuate first resisting section, the second elastic member includes an arcuate second resisting section, the second resisting section is shorter than the first resisting section. The sliding member is assembled with the fixing member and the second resisting section elastically resists with the first resisting section. The sliding member can automatically slide due to resilient forces between the first resisting section and the second resisting section.

12 Claims, 3 Drawing Sheets

SLIDING MECHANISM FOR SLIDE-TYPE ELECTRONIC DEVICE

BACKGROUND

1. Technical Field

The disclosure relates to sliding mechanisms, particularly, a sliding mechanism used in a slide-type portable electronic device to slidably interconnect two casings of the device.

2. Description of Related Art

Typical slide-type portable electronic devices have a cover, a housing, and a sliding mechanism connecting the cover to the housing. The cover slides over the housing, enabling opening/closing of the portable electronic device by the sliding mechanism.

Sliding mechanisms for slide-type portable electronic devices usually include a torsion spring. The torsion springs used are typically small to maintain compactness of the portable electronic devices. However, the small springs have low fatigue strength, accordingly, they easily fail with repeated use.

Therefore, there is room for improvement within the art.

BRIEF DESCRIPTION OF THE DRAWINGS

Many aspects of the present sliding mechanism for slide-type electronic device can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the diagrams.

DETAILED DESCRIPTION

Figure 1:
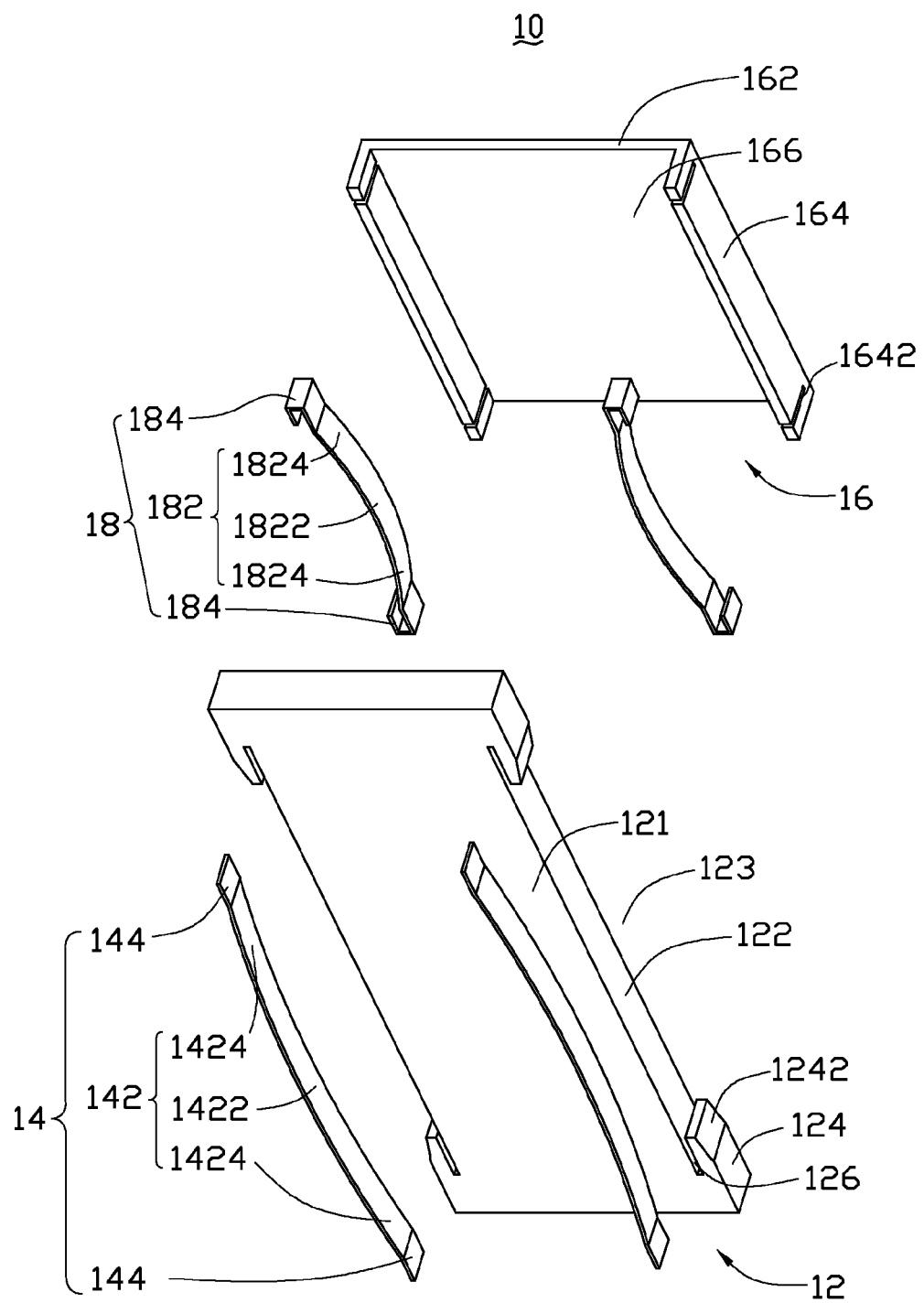
FIG. 1 is a disassembled view of a sliding mechanism according to a preferred embodiment.

FIG. 1 shows an exemplary sliding mechanism 10 used in a portable electronic device such as a mobile phone, PDA (personal digital assistant), etc. The sliding mechanism 10 includes a fixing member 12, two first elastic members 14, a sliding member 16, and two second elastic members 18. The two first elastic members 14 are secured in the fixing member 12 and forms a sliding module (not labeled); the two second elastic members 18 are assembled in the sliding member 16 and forms a fixing module (not labeled). The sliding module slidably engages with the fixing module to form the sliding mechanism 10.

The fixing member 12 is generally configured in a plane plate structure and has a rectangular plate portion 121 having two opposite sidewalls 122. Each sidewall 122 laterally protrudes two latching blocks 124 at two opposite ends thereof. Accordingly, an assembling space 123 is defined between the two latching blocks 124. A clamping gap 126 is defined between each latching block 124 and its respective sidewall 122. The two clamping gaps 126 respectively communicate with the assembling space 123 for securing the first elastic member 14 in the assembling space 123. Each latching block 124 has a slanted resisting surface 1242 laterally formed at an end adjacent to the assembling space 123. The resisting surface 1242 is used to resist against the second elastic member 18.

The first elastic member 14 is an elastic sheet and includes a first resisting section 142 and two latching ends 144. The latching ends 144 connect to two opposite ends of the first resisting section 142, respectively. The first resisting section 142 is arcuate and used to resist against the second elastic member 18. The first resisting section 142 includes a first apex 1422 and two first bending sections 1424 symmetrically arranged at two sides of the first apex 1422. The first apex 1422 projects laterally relative to the sidewall 122 after the first elastic member 14 is assembled in the fixing member 12. The first bending section 1424 is deformable and can be deformed when the first resisting section 142 resists against the second elastic member 18. The latching end 144 is rectangular and connects to the first bending section 1424. The latching end 144 latches into the clamping gap 126 of the fixing member 12 to secure the first elastic member 14 with the fixing member 12.

The sliding member 16 includes a main plate 162 and two flanges 164 perpendicularly formed at two sides of the main plate 162 to enclose an accommodation room 166. The main plate 162 is wider than the plate portion 122 and shorter than the plate portion 122. The flange 164 defines a latching slit 1642 adjacent to two ends thereof, and the latching slits 1642 are used to latch the second elastic member 18. The accommodation room 166 can receive the fixing member 12 therein.

The second elastic member 18 is an arcuate elastic sheet and shorter than the first elastic member 14. The second elastic member 18 can have a lower stiffness than the first elastic member 14. When the second elastic member 18 contacts and compresses the first elastic member 14, the second elastic member 18 deforms further than the first elastic member 14. The second elastic member 18 includes a second resisting section 182 and two hook sections 184 connecting to the two ends of the second resisting section 182, respectively. The second resisting section 182 is arcuate and used to engage with the first resisting section 142 of the first elastic member 14. The second resisting section 182 is structurally similar to the first resisting section 142 and includes a second apex 1822 and two second bending sections 1824. The second apex 1422 projects laterally relative to the internal side of the flange 164 after the second elastic member 18 is assembled in the sliding member 16, the second bending section 1824 is deformable and can be deformed when the second resisting section 182 resists against the first elastic member 14. The hook section 184 connecting to the bending section 1824 and can be formed by folding an extending end of the second resisting section 184 into a U-shaped structure. The hook sections 184 latch into the latching slits 1642 of the sliding member 16 to secure the second elastic member 18 with the sliding member 16.

Figure 2:
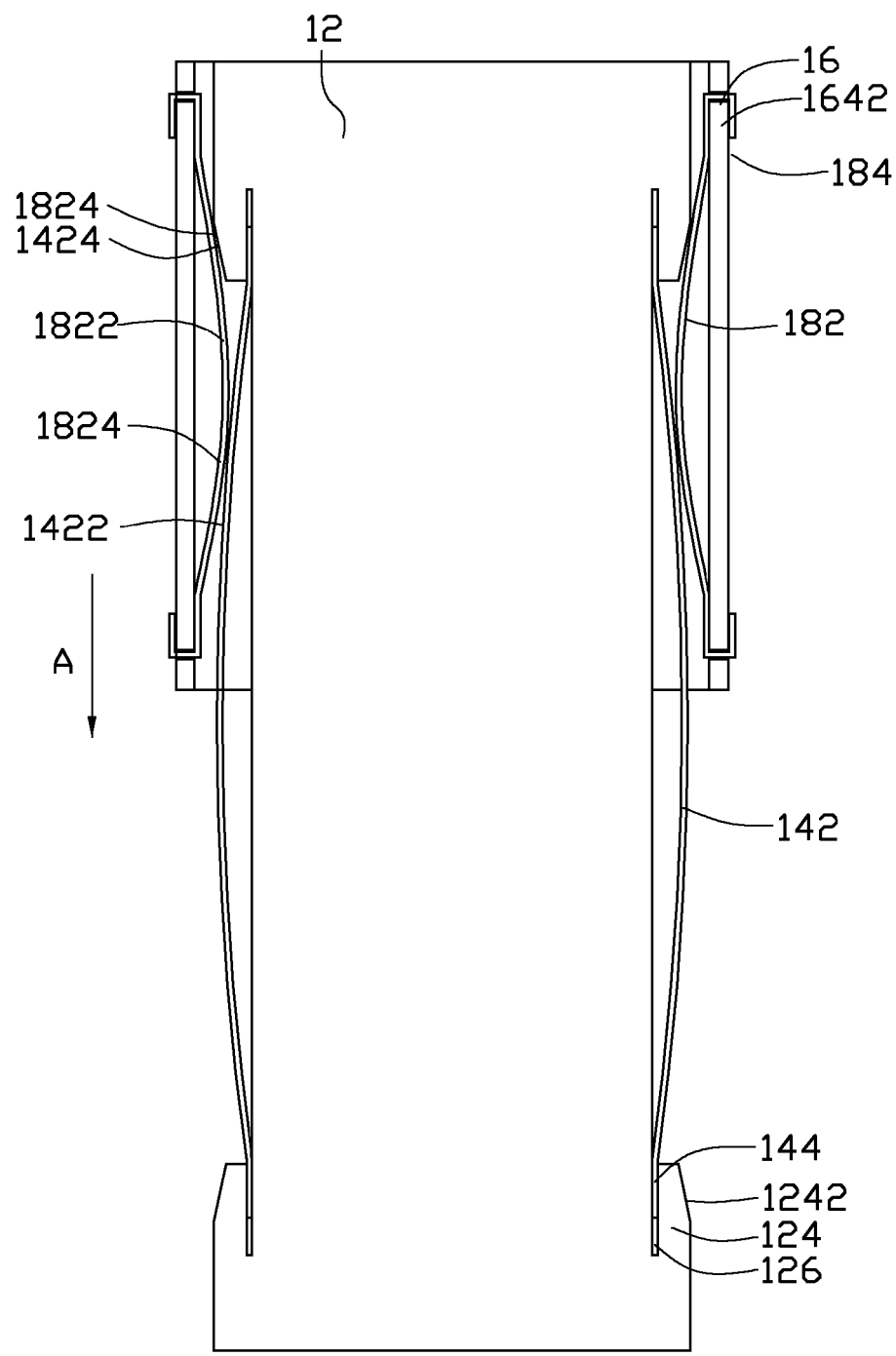
FIG. 2 is an assembled view of the sliding mechanism shown in FIG. 1.

Referring to FIG. 2, to assemble the sliding mechanism 10, the first elastic members 14 are assembled into the fixing member 12 to form the fixing module. The first elastic member 14 is secured to one sidewall 122. The two latching ends 144 are inserted into and rigidly positioned within the two clamping gaps 126 respectively. The first resisting section 142 is received in the assembling space 123 and protrudes laterally from the sidewall 122. The second elastic members 18 are assembled into the sliding member 16 to form the sliding module. The two hook sections 184 of each second elastic member 18 are clamped to the two latching slits 1642 of the flange 164 respectively. Thus, the second resisting section 182 is received in the accommodation room 166 and protrudes laterally relative to the internal side surface of the flange 164.

The sliding module is installed to the fixing module. The accommodation room 166 of the sliding member 16 receives an end of the fixing module therein. The two second bending sections 1824 of the second resisting section 182 resist against the first bending section 1424 of the first resisting section 142. The resisting surface 1242 of the latching block 124 and the sliding module maintain steadily at the end of the fixing module.

When subjected to an external force, sliding member 16 slides along the direction A shown in FIG. 2. Due to the first elastic member 14 having a higher stiffness than the second elastic member 18, the second resisting section 182 is gradually compressed by the first resisting section 142. The second apex 1822 resists against the first bending section 1422 of the first resisting section 142. The two second bending sections 1824 and the first bending sections 1422 further deform to be almost flat. When the second apex 1822 slides over the first apex 1422 of the first resisting section 142, the deformation of the second resisting section 182 can gradually release to drive the second apex 1822 to slide along the other first bending section 1422 after removal of the external force. The sliding of the second apex 1822 stops when the two second bending sections 1824 abut against the other first bending section 1424 and the resisting surface 1242 of the other latching block 124. In this case, the sliding module can maintain steadily at the other end of the fixing module.

Figure 3:
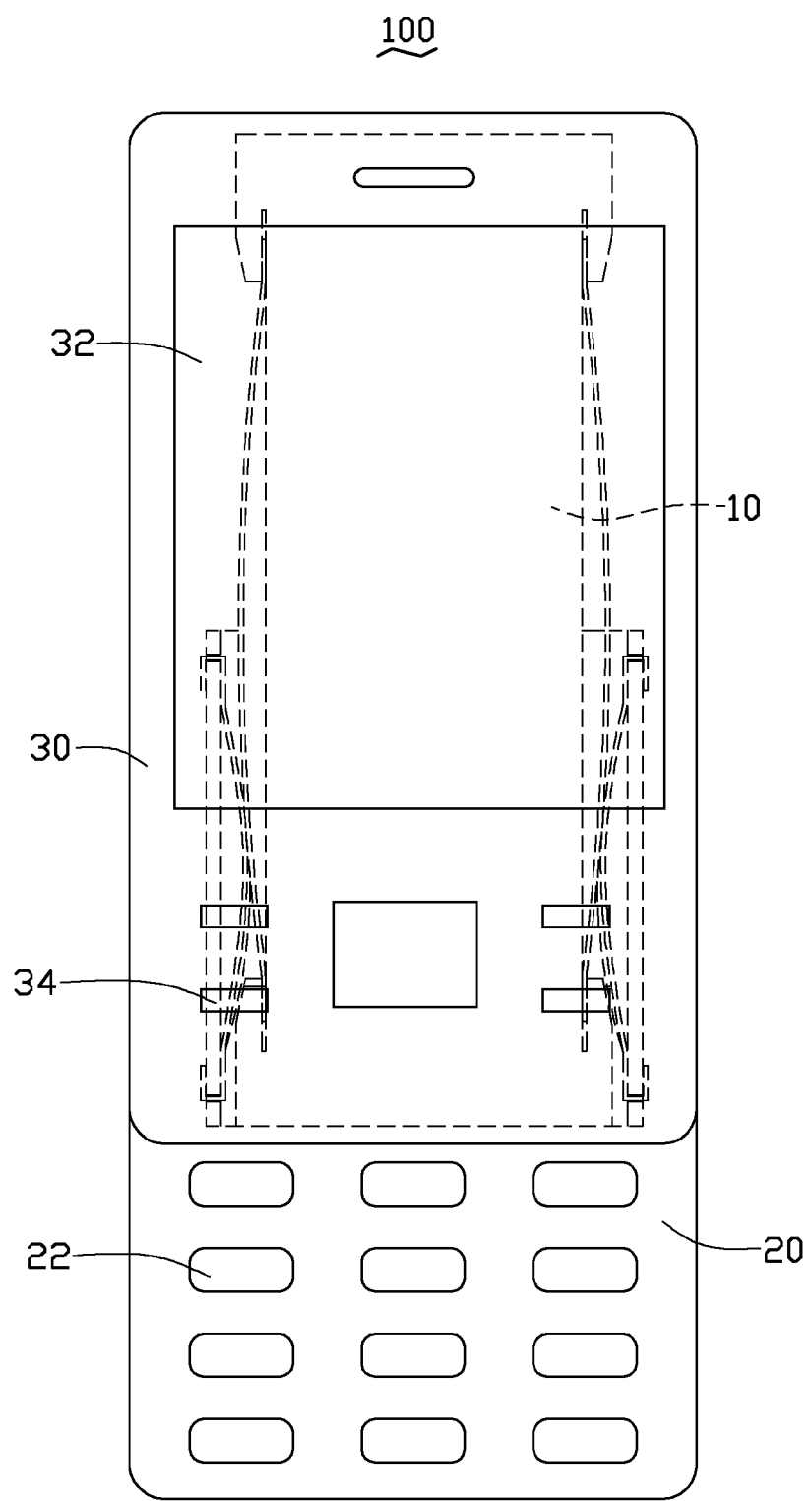
FIG. 3 is a schematic view of the sliding mechanism shown in FIG. 1 applied in a portable electronic device.

Referring to FIG. 3, the sliding mechanism 10 is applied in a portable electronic device 100 such as a mobile phone. The electronic device 100 includes a housing 20 and a cover 30 covering the housing 20. The housing 20 has a plurality of keys 22 arranged on the top surface. The keys 22 are positioned adjacent to an end of the housing 20. The cover 30 forms a display screen 32 and several function keys 34 on the top surface. The sliding mechanism 10 is assembled in the housing 20, the fixing module is secured to the cover 30, and the fixing member 12 is assembled with the cover 30. The sliding module is secured with the housing 20, and the sliding member 16 is mounted to the housing 20.

It is to be understood that the elastic members 14, 18 can be made of materials having different stiffness from the above presented embodiment. The second elastic member 18 can have higher stiffness than the first elastic member 14.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A sliding mechanism for a portable electronic device, comprising:
    a fixing member including at least one sidewall;
    at least one first elastic member arranged at the sidewall of the fixing member, the first elastic member including an arcuate first resisting section;
    a sliding member including at least one flange;
    at least one second elastic member arranged at the flange of the sliding member, the second elastic member including an arcuate second resisting section, the second resisting section being shorter than the first resisting section;
    wherein the sliding member is assembled with the fixing member, the flange is adjacent to the sidewall, the first resisting section and the second resisting section are positioned between the sidewall and the flange, the second resisting section elastically resists against the first resisting section, when the sliding member slides over a predetermined distance relative to the fixing member, the sliding member automatically further slides due to the resilient forces generated between the first resisting section and the second resisting section;
    wherein the fixing member includes a plate portion having two opposite sidewalls, each sidewall forms two opposite latching blocks thereon, the latching blocks secure opposite ends of the first elastic member, and the first resisting section protrudes laterally relative to the sidewall, the two latching blocks are oppositely formed at two ends of the sidewall, and an assembling space is formed between the two latching blocks, each latching block includes an inside surface and an outer surface, a clamping gap is defined between the inside surface and the sidewall for communicating with the assembling space to latch the first elastic member.

2. The sliding mechanism as claimed in claim 1, wherein the latching block has a resisting surface at the outer surface to resist against the second resisting section of the second elastic member.

3. The sliding mechanism as claimed in claim 1, wherein the first elastic member includes two latching ends respectively connecting to the two ends of the first resisting section, the two latching ends respectively latches into the two clamping gaps.

4. The sliding mechanism as claimed in claim 1, wherein the first resisting section includes a first apex to resist against the second resisting section, and two first bending sections concentrically symmetry about the first apex, the first bending section is deformable.

5. The sliding mechanism as claimed in claim 1, wherein the second resisting section includes a second apex to resist against the first resisting section, and two second bending sections concentrically symmetry about the second apex, the second bending section is deformable.

6. The sliding mechanism as claimed in claim 5, wherein the sliding member includes a main plate and two flanges perpendicularly forming at two sides of the main plate, the flanges and the main plate enclose an accommodation room to receive the fixing member therein.

7. The sliding mechanism as claimed in claim 6, wherein the flange defines two latching slits, the second elastic member includes two hook sections connecting to the two second bending sections respectively, the hook sections latch into the latching slits correspondingly, and the second resisting section protrudes laterally relative to the inner side surface of the flange.

8. A sliding mechanism for a portable electronic device, comprising:
    a fixing member including a plate portion and two opposite sidewalls;
    two first elastic members, each of the first elastic members arranged at each of the sidewalls of the fixing member; each first elastic member including an arcuate first resisting section;
    a sliding member including a main plate and two flanges perpendicularly forming at two sides of the main plate, the flanges and the main plate enclosing an accommodation room to receive the fixing member therein;
    two second elastic members, each of the second elastic members arranged at each of the flanges of the sliding member; each second elastic member including an arcuate second resisting section;
    wherein the sliding member is assembled in the accommodation room of the fixing member, each flange is adjacent to a corresponding sidewall, the first resisting section and the second resisting section are positioned between the sidewall and the flange, the second resisting section elastically resists against the first resisting section, when the sliding member slides over a predetermined distance relative to the fixing member, the sliding member automatically further slides due to the resilient forces generated between the first resisting section and the second resisting section;

wherein two opposite latching blocks are formed at two ends of each sidewall, an assembling space is formed between the two latching blocks, each latching block includes an inside surface and an outer surface, a clamping gap is defined between the inside surface and the sidewall, each first elastic member includes two latching ends respectively connecting to opposite ends of the first resisting section, each latching end is latched in the clamping gap to latch the first elastic member on the fixing member, and the first resisting section protrudes laterally relative to the sidewall.

9. The sliding mechanism as claimed in claim 8, wherein the latching block has a slanted resisting surface formed at one end adjacent to the assembling space at the outer surface thereof to resist against the second resisting section of the second elastic member.

10. The sliding mechanism as claimed in claim 9, wherein each flange defines two latching slits at two ends thereof, each second elastic member includes two hook sections connecting to opposite ends of each second resisting section respectively, the hook sections latch into the latching slits correspondingly, and the second resisting section protrudes laterally toward a corresponding sidewall.

11. A sliding mechanism for a portable electronic device, comprising:
  a fixing member including a plate portion, a first sidewall and a second sidewall opposite to the first sidewall;
  two first elastic members respectively arranged at the first sidewall and the second sidewall;
  a sliding member including a main plate, a first flange and a second flange opposite to the second flange perpendicularly forming at two sides of the main plate, the first flange, the second flange and the main plate enclosing an accommodation room to receive the fixing member therein;
  two second elastic members respectively arranged at the first flange and the second flange;
  wherein the sliding member is assembled in the accommodation room of the fixing member, the first flange is adjacent to the first sidewall, the second flange is adjacent to the second sidewall, one of the first elastic members and one of the second elastic members are positioned between the first sidewall and the first flange, the other of the first elastic members and the other of the second elastic members are positioned between the second sidewall and the second flange, each first elastic member elastically resists against a corresponding second elastic member, when the sliding member slides over a predetermined distance relative to the fixing member, the sliding member automatically further slides due to the resilient forces generated between the first elastic members and the second elastic members;
  wherein two opposite latching blocks are formed at two ends of each sidewall, an assembling space is formed between the two latching blocks, each latching block includes an inside surface and an outer surface, a clamping gap is defined between the inside surface and the sidewall, each first elastic member includes an arcuate first resisting section and two latching ends respectively connecting to opposite ends of the first resisting section, each latching end is latched in the clamping gap to latch each first elastic member on the fixing member, one of the first resisting sections between the first sidewall and the first flange protrude laterally toward the first flange, the other of the first resisting sections between the second sidewall and the second flange protrudes laterally toward the second flange.

12. The sliding mechanism as claimed in claim 11, wherein each flange defines two latching slits at two ends thereof, each second elastic member includes an arcuate second resisting section, two hook sections connecting to opposite ends of each second resisting section respectively, the hook sections latch into the latching slits correspondingly, one of the second resisting sections between the first sidewall and the first flange protrude laterally toward the first sidewall, the other of the second resisting sections between the second sidewall and the second flange protrudes laterally toward the second sidewall.

* * * * *